United States Patent [19]

Street et al.

[11] Patent Number: 5,377,022

[45] Date of Patent: Dec. 27, 1994

[54] METHOD AND APPARATUS FOR PAGE IMAGING AND DOCUMENT MOVEMENT DEVICE

[75] Inventors: Robert A. Street, Palo Alto; G. A. Neville Connell, Cupertino, both of Calif.

[73] Assignee: Xerox Corporation, Stamford, Conn.

[21] Appl. No.: 174,915

[22] Filed: Dec. 29, 1993

[51] Int. Cl.$^5$ ............................................... H04N 1/04
[52] U.S. Cl. ......................... 358/498; 358/471; 358/400; 358/500; 348/302; 348/308; 250/208.1
[58] Field of Search ............ 358/496, 471, 474, 482, 358/483, 498, 401, 400, 501, 296, 488; 348/302, 308; 250/208.1, 556; 355/68; 271/110, 111

[56] References Cited

U.S. PATENT DOCUMENTS

| | | | |
|---|---|---|---|
| 4,777,534 | 10/1988 | Yaniv et al. | 358/471 |
| 4,868,664 | 9/1989 | Yaniv et al. | 358/471 |
| 4,887,166 | 12/1989 | Kakinuma et al. | 358/471 |
| 4,939,580 | 7/1990 | Ishikawa et al. | 358/471 |
| 5,015,837 | 5/1991 | Hiroi et al. | 250/208.1 |

OTHER PUBLICATIONS

M. Matsumura et al., (IEEE Electron Device Letters), "Amorphous-Silicon Image Sensor IC", vol. EDL-1, No. 9, Sep. 1980, pp. 182–184.

R. A. Street et al., (Material Research Society Symposium Proceedings), "Amorphous Silicon Sensor Arrays For Radiation Imaging", vol. 192, 1990, pp. 441–452.

M. J. Powell et al., (Material Research Society Symposium Proceedings), "Amorphous Silicon Image Sensor Arrays", vol. 258, 1992, pp. 1127–1137.

*Primary Examiner*—Edward L. Coles, Sr.
*Assistant Examiner*—Fan Lee
*Attorney, Agent, or Firm*—Oliff & Berridge

[57] ABSTRACT

A paper handling device, which uses a two-dimensional imaging sensor array, can quickly image a stack of documents. The two-dimensional array is positioned in direct contact with a document on top of the stack of documents. The sensor array images the document and is then lifted away from the page. The document is moved to an output tray. A first modification allows for recirculation of the documents for two-sided copying. A second modification, positions the sensor array above the documents in the output tray after the next document is moved from the input tray. With each of these designs, around one hundred pages can be imaged in less than a minute.

27 Claims, 2 Drawing Sheets

METHOD AND APPARATUS FOR PAGE IMAGING AND DOCUMENT MOVEMENT DEVICE

BACKGROUND OF THE INVENTION

1. Field of the Invention

This invention relates to improvements in scanning a two-dimensional images from multiple sheets of paper. More particularly, this invention uses a two-dimensional image sensor array to scan a single sheet of paper, and move the next sheet into position to be scanned.

2. Description of the Related Art

Electronic document technology requires a method of electronically inputting pages of text into some memory device. The conventional method is to use a linear scanner and mechanically move the documents across the scanner, or the scanner across the document. These devices have an input paper tray, an output paper tray and a distinct scanner module. The scanner module usually includes the illumination source and an optical focusing device, which is either a SELFOC lens or more conventional optics. These devices tend to be bulky because of the size of the optical focusing device and the illumination source must be bright.

The movement of the documents must be precise because the scanners usually only scan a single line or a few lines at a time. There is often a registration problem associated with uncontrolled paper motion which results in distortion of the image. Sometimes the scanner must make three passes across each line for color images. Therefore, these devices tend to be slow and scanning a single page document could take longer than a minute.

Addressable two-dimensional image sensor arrays made from amorphous silicon were conceived by M. Matsumura et al (IEEE Electron Device Letters, vol. EDL-1, page 182, 1980) and were demonstrated by Street et al (Material Research Society Symposium Proceedings, vol. 192, page 441, 1990). The use of these arrays for contact imaging was reported by Powell et al (Material Research Society Symposium Proceedings, vol. 258, page 1127, 1992).

Document handlers are widely used in copiers and printers. The techniques of transferring paper between input and output trays and of inverting sheets of paper are well known. However, such document handlers have not been applied to a device in which a scanner is incorporated in either the input or output tray.

SUMMARY OF THE INVENTION

The invention uses a two-dimensional image sensor array which allows a whole document page to be imaged at one time. Because imaging an entire page takes less than a hundred milliseconds, several hundred pages can be imaged in a minute. Color images are scanned by either adding filters to the sensor array or using color illuminators. If color illuminators are used, three sequential images using a different color are taken of the color document. Less than a second is required to complete the processing of one color page, therefore a hundred or more color pages can be imaged in a minute. The registration problems are eliminated because the whole page is imaged simultaneously, and can be illuminated by a single brief flash of light.

In order to have a high speed document input device, the invention describes a document handling system in which the scanner is incorporated into either the input or the output tray. This reduces the complexity of the mechanical structure as well as the imaging optics of the prior art.

BRIEF DESCRIPTION OF THE DRAWINGS

For a better understanding of the invention and further features thereof, reference is made to the following detailed description of the invention to be read in connection with the accompanying drawings, wherein.

DETAILED DESCRIPTION OF THE PREFERRED EMBODIMENTS

While this invention is described in some detail herein, the specific reference to an illustrated embodiment, is to be understood that there is no intent to be limited to that embodiment. On the contrary, the aim is to cover all modifications, alternatives and equivalents falling within the spirit and scope of the invention as defined by the claims. For example, the invention is applicable to any document handling device which uses the two-dimensional scanner array.

Two-dimensional sensor arrays are fully described in concurrently filed U.S. patent application Ser. No. 08/174,913, which is entitled "A Compact Document Imager and Display Apparatus and a Compact Facsimile Machine" by Robert Street et al.; Attorney Docket No. JAO 29025D/92107, which is incorporated by reference in its entirety.

Figure 1:
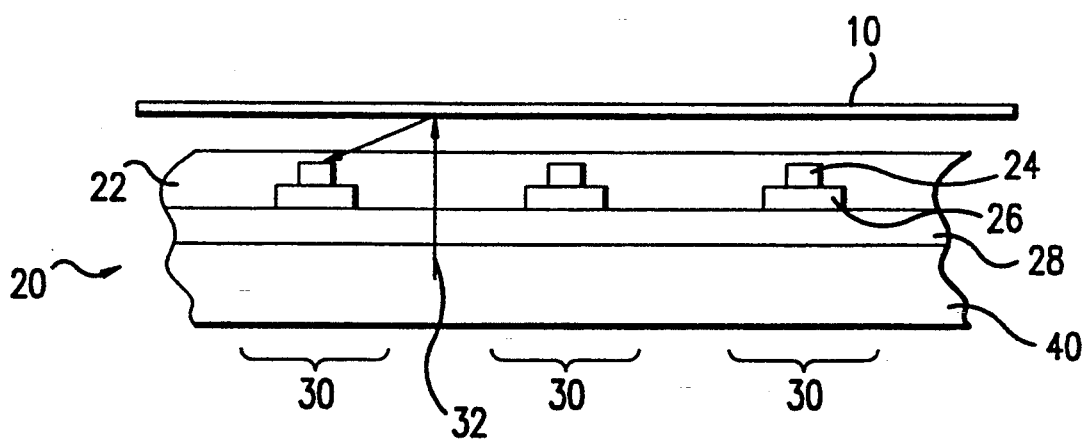
FIG. 1 shows the two-dimensional scanner array used in the invention.

FIG. 1 shows a portion of a two-dimensional sensor array 20. Several sensor pixels 30 are shown, but it is assumed that the same structure extends in both the X and Y directions to cover a page size area. The sensor array 20 is designed to allow part of the light from the illuminator 40 to pass through the glass substrate 28. For example, each photosensitive area may be about 40×40 microns in size, but the distance between each photosensitive area is 60–120 microns. A resolution of approximately 200–400 spots/inch is typical for a document scanner.

The illuminator 40 is a standard type illuminator widely used in a backlit liquid crystal displays and portable computers. Instead of an illuminator generating white light, the illuminator can be used to sequentially produce three different colors for imaging a single color page. The three colors would normally be red, green and blue (RGB).

The top protective layer 22 protects the elements of the imager from scratches. For direct contact imaging, the document is slightly spaced away from the sensor array for illuminating. For the best resolution, the documents must be placed about half the dimension of a pixel or less from the sensor array (i.e. typically 30–60 microns). One design uses thin sheets of glass bonded to the surface of the array. Another method is to coat the sensor array surface with an extremely hard transparent material such as Silicon Carbide by a chemical vapor deposition (CVD) process. The advantage of the silicon carbide is that it provides an extremely hard and permanent surface over the sensor array. Unfortunately, the silicon carbide layer is not always thick enough to help illumination. Therefore, the thin sheets of glass may be needed to increase the distance between the sensor array and the document.

Each sensor pixel 30 has a photosensitive element 24, which generates signals in response to light rays 32. The photosensitive elements 24 are preferably amorphous semiconductor photodiodes, although any thin film photosensor could perform this function. The readout is controlled by a thin film transistor (TFT) at each pixel, made from amorphous or polycrystalline silicon. Sensor arrays with diodes to perform the readout are also possible. The two-dimensional silicon photodiode arrays with a silicon TFT read out scheme are fabricated on glass substrate 28. Metal gate control lines and output lines allow an electronic image to be sent to the external electronics (not shown). A light shield 26 is located below the photosensitive element 24 to inhibit the direct light from the illuminator 40 from triggering the photosensitive element 24.

The document 10 is placed on top of the protective layer 22. Light rays 32 generated by the illuminator 40 pass through the glass substrate 28 and strike the surface of the document 10. Dark areas on the document 10 absorb the light rays 32. White areas reflect the light rays and trigger the photosensitive element 24.

Figure 2:
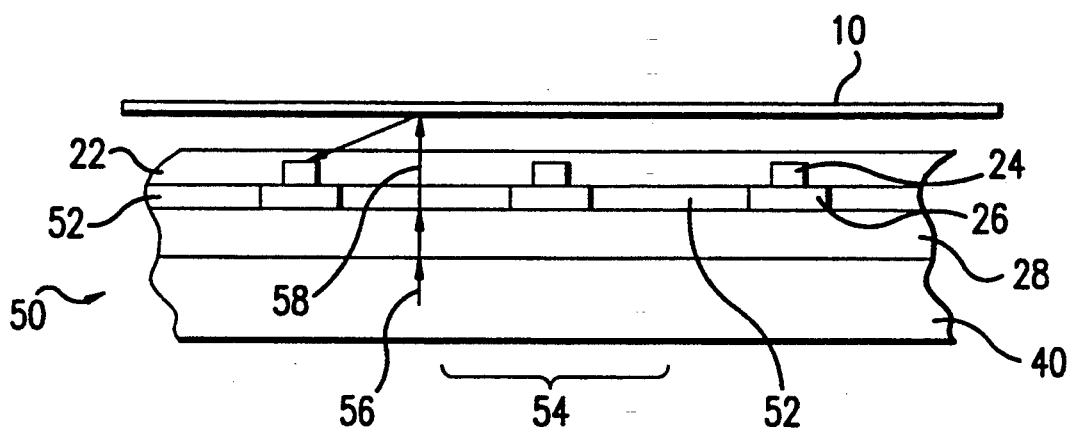
FIG. 2 shows the two-dimensional scanner array with color filters for color imaging.

FIG. 2 shows a sensor array that has color filters to form color pixels 54. Instead of using an illuminator with colored lights, the sensor array 50 can use an illuminator 40 generating white light. Each photosensitive element 24 has an adjacent color filter 52. The white light rays 56 are converted to a color light ray 58 and directed toward the document. The photosensitive element 24 detects the reflected light from the document 10.

If only a single sheet of paper or a transparency is being copied, then the illuminator 40 could be turned off. Ambient room light is typically 1-10 $\mu$Watts/cm$^2$, which corresponds to $10^{13}$-$10^{14}$ photons/second-cm$^2$. The sensor array can easily detect $10^7$ photons/pixel, and therefore, ambient room light is enough to trigger the photosensitive elements 24. An image read time of about one second per page is adequate. Thus, a sensor size of no more than 10×10 microns is needed, and the sensor array can be a small fraction of the pixel size if desired.

Figure 3:
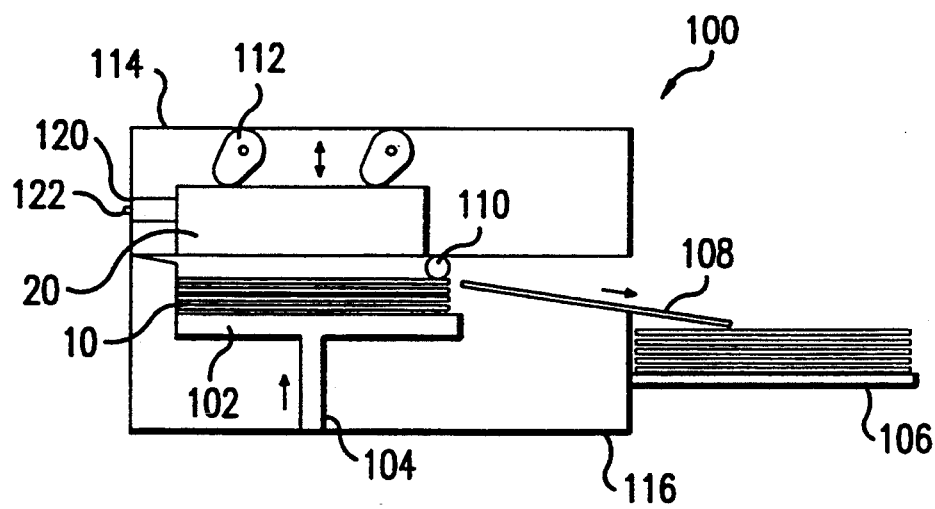
FIG. 3 shows a document handling device with a two-dimensional scanner array of the first preferred embodiment.

Referring to FIG. 3, the first preferred embodiment for a document handling device using a two-dimensional imaging array is shown. The document handling device 100 has an encasement, which has any shape that protects the elements and forms a compact document handling device. The encasement has a cover portion 114 and a bottom portion 116. Preferably, the encasement should be made of plastic to make the document handling device as light as possible.

The sensor array 20 is usually in contact with the surface of the document containing the image to be imaged. In the first preferred embodiment, the sensor array 20 is mounted face downwards so the imaging surface can come into contact with the top sheet of the document in the input paper tray 102. The illumination source is behind the array and part of its physical structure as described above.

Eccentric wheels 112 are used to move the sensor array 20 up and down in a reciprocating motion. This allows the surface of the sensor array to be in direct contact with the surface of the document. A motor (not shown) is attached to the eccentric wheels 112 to position the sensor array. After the document is imaged, the motor adjusts the eccentric wheels so that the sensor array is lifted above the document. Any number of eccentric wheels can be used. Cams can also be used.

A stack of documents 10 is placed in the input tray 102. The documents are loaded by lifting the array assembly 20 and the top cover portion 114. A height adjuster 104 is used to continually push the documents into position so that the top document is in the same position, i.e. constant height. After the document is imaged and ejected from the input tray, the height adjuster 104 moves in the upward direction to put the next document into position.

Paper grabbing roller 110 moves the top document from the input tray 102 to the output tray 106 via the paper guide 108. About one-half inch of space on the edge of the document is needed for the roller. If the roller remains in position during imaging, then the sensor array can not image the edge of the document. An alternative method is move the roller 110 out of the way during imaging. When the sensor array 20 is lifted above the document, the roller 110 moves into position to move the top document into the output tray.

The document handling device operates as follows. The documents are loaded onto the input tray 102. The height adjuster moves the top document into position. The eccentric wheels 112 lower the sensor array 20 so that it is in direct contact with the top document. A single flash of light from the illuminator is produced. The sensor array detects the images on the top document in as little as a few microseconds. The electronic image is read-out and stored in the processor 120. It takes approximately thirty milliseconds to read the output of the sensor array. Processing the electronic image can be performed while the next document is being positioned. If a color image is needed, then three sequential flashes of different colors are performed.

After the image is captured, the sensor array 20 is lifted from the document by the eccentric wheels 112. The top document is moved to the output tray by the paper grabbing rollers 110. The next document is positioned by the height adjuster 104 and is imaged as before. After all of the documents are imaged, the processor 120 can output the electronic images to another device via the connector 122. The electronic images can be stored in a memory chip such as a RAM for later output to a computer or sent to a facsimile machine by using a modem. In the alternative, the processor 120 can output each electronic image to an external device before imaging the next document. This eliminates the need of a large storage device.

The advantage of the configuration of the first preferred embodiment is that the paper registration is accomplished when the document is placed in the tray. Thus, the requirements of the document handling system are minimal. The disadvantage is that the rollers 110, which may interfere with the sensor array, are needed to remove, the document.

Figure 4:
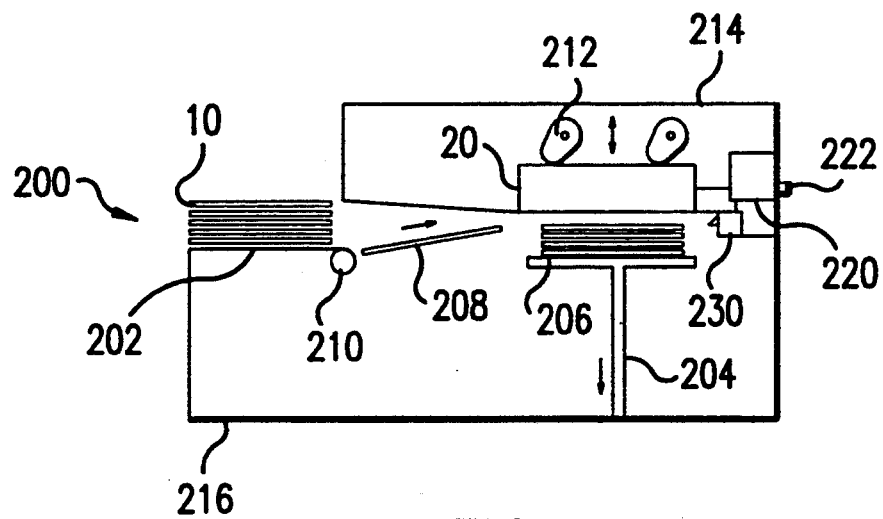
FIG. 4 shows a second preferred embodiment for a document handling device with a two-dimensional scanner array.

Referring to FIG. 4, a second preferred embodiment for a document handling device using a two-dimensional imaging array is shown. The document handling device 200 has an encasement, which could have any shape desirable. The encasement has a cover portion 214 and a bottom portion 216. Similar to the first preferred embodiment, the sensor array 20 is mounted to face downwards so the sensor array surface is in direct contact with the top document in the stack of documents. The illumination source is behind the array and part of its physical structure as described above.

A motor (not shown) controls the movement of the eccentric wheels 212, which move the sensor array 20 up and down in a reciprocating motion. Paper grabbing roller 210 takes paper from the bottom of the input tray. Paper guide 208 directs the document to the output tray 206. Height adjuster 204 lowers the output tray as the stack of documents increases. This allows the top document on the stack to be in position for imaging. After all of the documents are imaged or read out, the stack can be removed from the output tray 206 by lifting the top cover portion 214 of the device, or by lowering the paper stack to a convenient place. The controller 220 processes and stores the images imaged or read out by the sensor array 20. Output connector 222 allows the stored images to be sent to an external device.

The document handling device 200 operates as follows. The documents are loaded onto the input tray 202. The paper grabbing roller 210 moves the bottom document in the input tray 202 toward the output tray 206 via the paper guide 208. The eccentric wheels 212 lower the sensor array 20 so that it is in direct contact with the top document. A single flash of light from the illuminator is produced and the sensor array images the top document. Similar to the first embodiment, three color flashes may be needed to scan one color document.

After the image is captured, the sensor array 20 is lifted from the document by the eccentric wheels 212. The height adjuster 204 lowers the output tray 206. The next document is moved from the input tray 202 to the output tray 206. The sensor array 20 is again lowered for scanning. After all of the documents are imaged, the processor 220 can output the electronic images to another device via the connector 222.

Unlike the first preferred embodiment, the advantage of the configuration of the second preferred embodiment is that no rollers are needed in the output tray so the sensor array can image the entire document. The disadvantage is that the document handling system must be able to position the document correctly for imaging. If the sensor array is larger than the documents, then the positioning of the document does not have to be precise.

Figure 5:
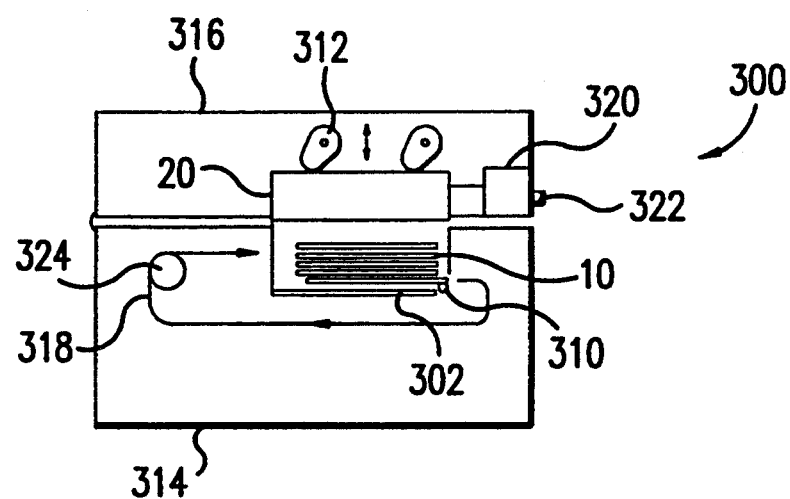
FIG. 5 shows a third preferred embodiment of a document handling device using a two-dimensional scanner which recirculates the document for two sided imaging.

Referring to FIG. 5, a third preferred embodiment for a document handling device with a single recirculating paper tray is shown. The document handling device 300 has an encasement, which could have any desired shape. In this preferred embodiment, the encasement has a cover portion 316 containing the sensor array 20 and a bottom portion 314 for holding and recirculating the documents.

Similar to the first preferred embodiment, the sensor array 20 is mounted to face downwards so that the surface of sensor array 20 is in direct contact with the top document in the stack. The illuminator is behind the array and part of its physical structure as described before.

A motor (not shown) controls the movement of the eccentric wheels 312, which move the sensor array 20 up and down in a reciprocating motion. The controller 320 processes and stores the electronic images from the sensor array 20. Output connector 322 allows the stored images to be sent to an external device.

The two-sided documents 10 are placed in the tray 302 for imaging. Paper grabbing roller 310 moves the bottom document from the stack. The document follows the paper path 318 and is turned over by structure 324, using known techniques. The document is placed on top of the stack ready for imaging. The eccentric wheels 312 lower the sensor array 20 so that it is in direct contact with the top document. A single flash of light from the illuminator is produced and the sensor array images the top document. Similar to the first embodiment, three color flashes may be needed to image or read one color document.

After the image is captured, the sensor array 20 is lifted from the document by the eccentric wheels 312. The next document is moved from the bottom of the stack. This process continues until both sides of documents in the stack are imaged. After all of the document are imaged or read out, the stack can be removed from the tray 302.

Instead of automatically turning the documents over, the recirculation can simply put the bottom document on top without reversing the side. After the stack of documents is imaged, then the documents can be inverted manually for the second-side imaging.

Similar to the previous embodiments, this configuration has the advantage of good paper registration when the documents are placed in the tray. Also, the rollers are below the documents, therefore they do not interfere with the imaging of the documents. The imaging assembly forms a top cover of the device, providing protective cover and light shield.

In all three of the preferred embodiments, the documents are separated from the imager after imaging by using an air-knife or similar means. For example, an airknife 230 is shown by FIG. 4.

Although the invention has been described with particularity, it is intended to be illustrative of preferred embodiments. It is understood that the disclosure has been made by way of example only. Numerous changes in the combination and arrangements of the parts, steps and features can be made by those skilled in the art without departing from the spirit and scope of the invention, as hereinafter claimed.

What is claimed is:

1. An apparatus for moving and imaging at least one document comprising:
    a two-dimensional image sensor array for capturing an image on the document and for generating electrical signals representing the image;
    positioning means for moving the image sensor array between a first position where the image sensor array is in direct contact with the document and a second position where the image sensor array is spaced from the document;
    at least one tray opposing the image sensor array for holding the document such that the document is between the image sensor array and the at least one tray; and
    document moving means for moving the document relative to the at least one tray.

2. The apparatus of claim 1, wherein the positioning means includes eccentric wheels to move the image sensor array in a reciprocating motion between the first and second positions.

3. The apparatus of claim 1, wherein the at least one document is a document in a stack of documents to be imaged, and the at least one tray holds the stack of documents.

4. The apparatus of claim 1, wherein the image sensor array comprises:
- a plurality of photosensitive elements triggered by light reflected from the document;
- a plurality of switching elements allowing read-out of the image;
- an illuminator for illuminating the document;
- a plurality of light shields, each light shield located between each photosensitive element and the illuminator; and
- a processor for processing signals from the plurality of photosensitive elements.

5. The apparatus of claim 4, wherein each photosensitive element comprises an amorphous semiconductor photodiode.

6. The apparatus of claim 4, wherein each switching element comprises an amorphous semiconductor thin film transistor.

7. The apparatus of claim 4, wherein each switching element comprises a polycrystalline semiconductor thin film transistor.

8. The apparatus of claim 1, wherein a controller adjusts the positioning means and operates the document moving means.

9. The apparatus of claim 1, wherein the at least one document is a document in a stack of documents to be imaged, and the at least one tray comprises:
- an input tray containing the stack of documents that are imaged and then removed from the input tray; and
- an output tray containing the stack of documents already imaged.

10. The apparatus of claim 9, wherein the input tray further comprises height adjusting means to keep the document to be imaged at a predetermined height.

11. The apparatus of claim 9, wherein the document moving means is a roller located adjacent to the image sensor array for moving the document toward the output tray after the document is imaged.

12. The apparatus of claim 11, wherein the roller includes moving means for moving the roller into position after the image sensor array is moved away from the document.

13. The apparatus of claim 9, further comprising a paper guide for assisting the movement of the document from the input tray to the output tray.

14. The apparatus of claim 1, wherein the at least one document is a document in a stack of documents to be imaged, and the at least one tray comprises:
- an input tray containing the stack of documents to be imaged; and
- an output tray receiving the document from the input tray and holding the document for imaging by the sensor array.

15. The apparatus of claim 14, wherein the output tray further comprises height adjusting means to keep the document to be imaged at a predetermined height.

16. The apparatus of claim 14, wherein the document moving means is a roller adjacent the document in the input tray for moving the document toward the output tray for imaging.

17. The apparatus of claim 14, further comprising a paper guide for assisting the movement of the document from the input tray to the output tray.

18. The apparatus of claim 1, wherein the at least one document is a document in a stack of documents to be imaged, and the document moving means moves the document from a first end of the stack to a second end of the stack.

19. The apparatus of claim 18, wherein the document moving means inverts the document to image a second-side of the document.

20. The apparatus of claim 18, wherein the tray further comprises height adjusting means to keep the document to be imaged at a predetermined height.

21. The apparatus of claim 18, wherein the document moving means is at least one roller located adjacent the second end of the stack to remove the document from the stack.

22. The apparatus of claim 1, wherein the document is separated from the sensor array after imaging by using an air-knife 23. A method of imaging and moving a stack of documents using an image sensor array comprising the steps of:
- positioning the image sensor array in direct contact with a first document of the stack of documents in an imaging tray;
- capturing an image of the first document;
- withdrawing the image sensor array from the first document; and
- arranging the stack so that a second document in the stack faces the image sensor array.

24. The method of claim 23, wherein the imaging tray is an input tray, and the stack of documents is placed into the input tray and the arranging step moves the first document to an output tray after imaging.

25. The method of claim 23, wherein the imaging tray is an output tray, and the stack of documents is placed into an input tray and the arranging step moves the first document to the output tray for imaging.

26. The method of claim 23, wherein the stack of documents is placed into the imaging tray and the arranging step moves the second document from one end of the stack to an opposite end of the stack.

27. The method of claim 26, wherein the second document is turned over before being moved to the opposite end of the stack of documents.

* * * * *